Patented Apr. 21, 1925.

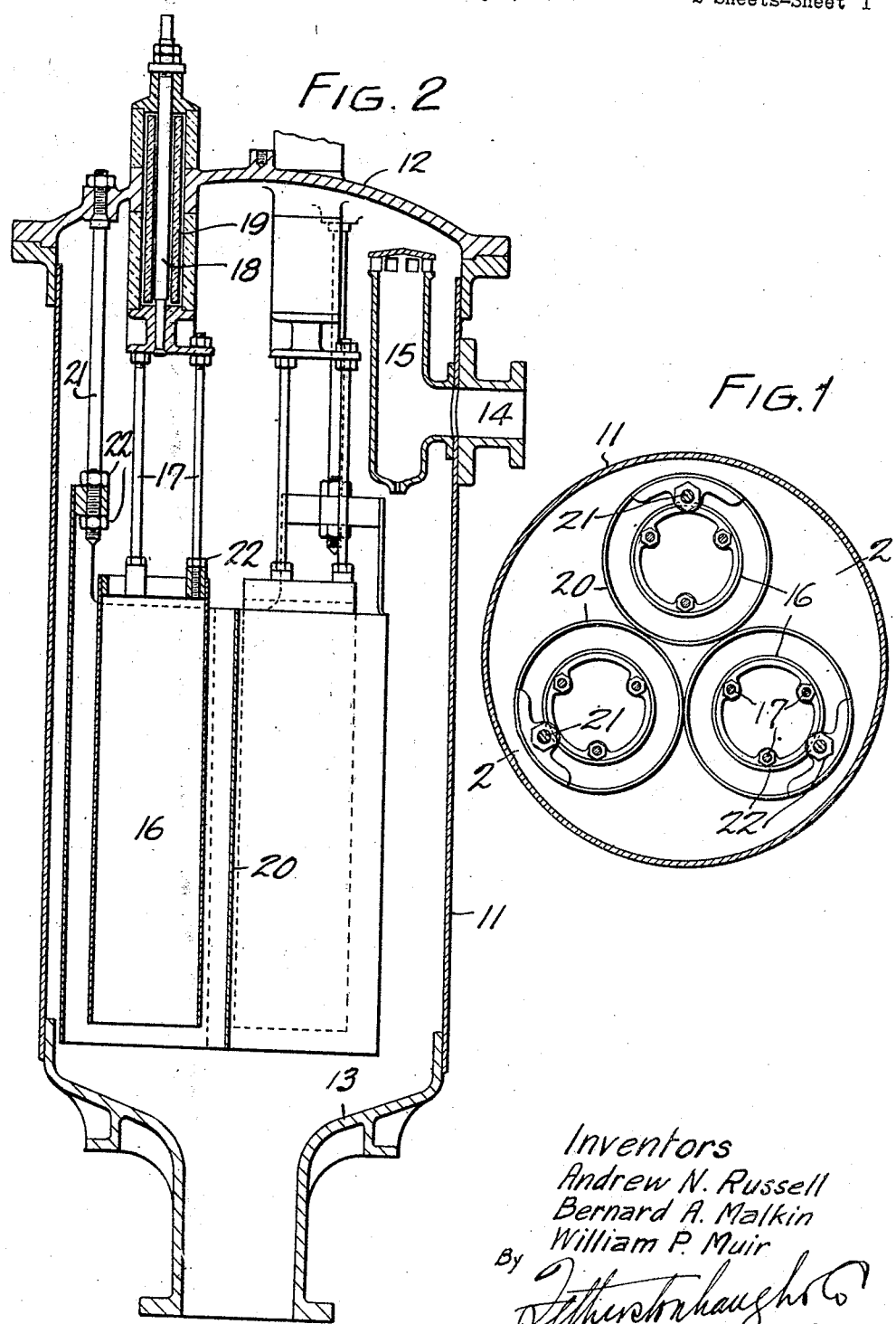

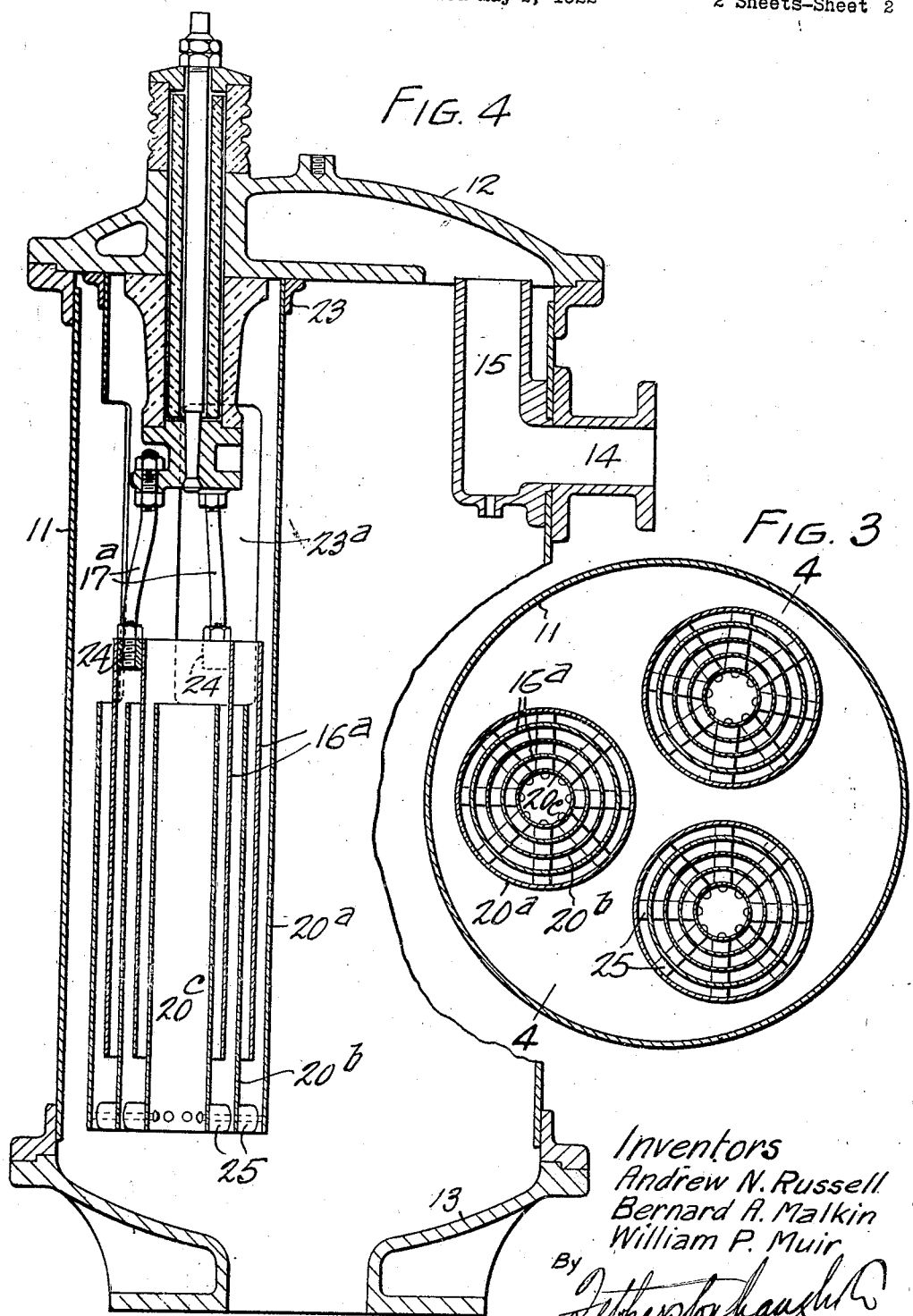

1,534,079

UNITED STATES PATENT OFFICE.

ANDREW N. RUSSELL, BERNARD A. MALKIN, AND WILLIAM P. MUIR, OF LACHINE, QUEBEC, CANADA.

ELECTRIC STEAM GENERATOR.

Application filed May 2, 1922. Serial No. 558,028.

*To all whom it may concern:*

Be it known that we, ANDREW N. RUSSELL, a citizen of the United States of America, BERNARD A. MALKIN and WILLIAM P. MUIR, subjects of the King of Great Britain, and residents of the city of Lachine, in the Province of Quebec and Dominion of Canada, have invented certain new and useful Improvements in Electric Steam Generators, of which the following is a full, clear, and exact description.

This invention relates to improvements in electric steam generators or water heaters and the object of the invention is to provide for uniform separation and current flow between the electrodes and neutral plates.

A further object is to provide a construction particularly efficient and serviceable for operations at low voltage.

A further object is to provide a construction doing away with submerged separating insulators. Various other objects and advantages will be ascertained from the following description.

The invention resides in providing in polyphase electric steam generators, tubular electrodes and tubular neutral plates, concentric with the electrodes, for the several phases of the current within a single tank or boiler. The neutral plates corresponding to the several phases are each electrically and mechanically connected to the boiler in such a manner that they are rigidly held and cannot move relatively to the shell or to the electrodes. This support may be effected in a variety of ways, of which only two are hereinafter dealt with in detail. Broadly speaking, two methods of arrangement are possible and have been disclosed, namely, one in which the several neutral plates pertaining to the phases are connected for mutual support. The second method is to support the neutral plate or plates pertaining to each phase independently of one another. The neutral plates are, according to this invention, preferably tubular so as to completely encircle the electrodes pertaining thereto. Each phase of the system is connected to one or more electrodes and for each electrode there is a surrounding neutral plate. Where a plurality of electrodes are used for any phase these are, preferably, arranged concentrically with respect to one another, and, of course, concentrically with the neutral plates.

In the drawings which illustrate the invention;—

Figure 1 is a cross sectional view of a steam generator showing the arrangement of electrodes and neutral plates in plan.

Figure 2 is a vertical sectional view on the line 2—2, Figure 1.

Figure 3 is a cross sectional view of a slightly modified form of generator.

Figure 4 is a vertical sectional view of a generator on the line 4—4, Figure 3.

Referring more particularly to the drawings 11 designates the cylindrical shell of a generator of any suitable construction, but preferably having cast top and bottom ends 12 and 13, and provided a short distance below the top with a steam outlet 14 provided with a separator 15.

In the arrangement illustrated in Figures 1 and 2, three electrodes 16 are provided for use in a three phase system. These electrodes are each tubular and are suspended in spaced relation and parallelism with the another and with the axis of the boiler. The suspension is, preferably, effected by means of a plurality of rods 17 connected between the tubular electrode and a terminal device 18 which passes out of the boiler top through any suitable insulating device 19.

Each electrode is encircled by a tubular neutral plate 20 disposed concentrically with the electrode. These neutral plates may be supported in a variety of ways. As illustrated in Figures 1 and 2 the neutral plates are arranged in contact with one another, and are connected at their lines of contact in any suitable manner such as by welding. If fastening devices are used it is essential that these devices be flush with the inner surface plates so as not to provide projection upon which the current discharge would concentrate. The group of neutral plates is suspended from the top of the boiler by a suitable number of supporting bolts 21. When the plates are connected together in the manner just described, one support connected to each plate will ordinarily be sufficient if these supports are arranged symmetrically with respect to the centre of the group and are uniformly spaced. A greater number of supports may be provided if desired, but are believed to be unnecessary and inadvisable. With the arrangement shown, each plate is supported directly at one point from the boiler, and at a plurality of points, disposed symmetrically of the first point, by the other plates. Thus, each plate has sufficient stable support to keep it from rocking within the boiler. By providing the connections between the plate group and the boiler at the greatest possible distance from the centre of the group, the whole group has stable support. The supporting members 17 and 21 are, preferably, screw connected to the electrodes and plates respectively, or provided with adjusting nuts 22 so that the necessary adjustments may be effected to position the neutral plate group axially parallel with the boiler, and to position the electrodes exactly parallel and concentric with the neutral plates.

In Figures 3 and 4 there is illustrated a slightly different arrangement of the neutral plates in which each neutral plate is supported independently of the others. According to this modification each neutral plate designated 20ª is continued to the top of the boiler and connected directly to the top by any suitable means such as a flange 23. As the neutral plate is tubular and encircles the electrode it is necessary to provide for the escape of steam generated between the two, and this is accomplished by forming one or more openings 23ª in the plate above the normal water level of the boiler. For each phase of the system there may be provided a single electrode tube, and a single tubular neutral plate encircling the same as illustrated in Figures 1 and 3, or there may be provided for each phase an electrode comprising a plurality of concentrically arranged tubes for each of which tubes there is provided an encircling neutral tube as illustrated in Figures 3 and 4.

The concentric tubular members forming such an electrode and designated 16ª are held in concentric relation by spacers 24 inserted at intervals between the upper ends of the tubes. These spacers serve to electrically and mechanically connect the tubes, and also as a means for attaching the supporting rods 17ª. As shown, the electrode tubes extend above the upper ends of the neutral plate tubes, whereas the neutral plates extend below the lower ends of the electrode tubes. The length of the electrode tubes as compared with their diameters is such that the spacing at the upper end only is sufficient to hold them rigid relatively to one another so that they will be exactly concentric throughout their lengths. The outermost neutral tube 20ª encircles the outermost electrode tube 16ª.

A neutral tube 20ᵇ for each additional electrode tube is provided encircling the same, as indicated in Figure 4. Such additional neutral tubes are supported at their lower ends from the lower end of the outer tubes 20ª by means of spacers 25 located below the ends of the electrode tubes, and in spaced relation to one another, so as to permit of water flow between the tubes 20ª and 20ᵇ. If desired, another inner additional neutral tube 20ᶜ may be provided within the innermost electrode tube and supported in the same manner as the tube or tubes 20ᵇ. The tubes 16ª, 20ª, 20ᵇ and 20ᶜ are, preferably, arranged equidistantly, but this arrangement may be otherwise if desired.

The supporting of the inner neutral tubes from the outer is similar to the connection of the electrode tubes to one another, and is sufficient to hold them relatively rigid so that the upper ends will remain concentric with the electrode tubes. In each case the connection between the inner and outer tubes is both mechanical and electrical.

The operation of the device is on the well understood principle. Water is placed in the boiler to a suitable depth so that the various tubes are partially submerged. The three points of a three phase system are connected to the three leads 18, and the boiler itself is, for safety, grounded and, therefore, grounds the neutral plates which are electrically connected to it. When the current is turned into the device it flows from the submerged portion of one electrode through the water to the encircling neutral plate, and from this plate, by an undeterminable path, to one of the other electrodes. Presumably, this path is partly through the neutral plates and boiler top, and partly through the water itself. The water acts as a resistance and is thereby heated to such a temperature that steam is given off. It will be observed that each electrode, whether of the single type or multiple type variety, is encircled by a neutral plate, thus avoiding all possibility of current flow between any electrode and the boiler shell. In the simplest arrangement of electrodes and neutral plates illustrated in Figures 1 and 2, only the outer surface of each electrode tube is active, but in the arrangement shown in Figures 3 and 4 both the inner and outer surfaces of the electrode tubes are active; this arrangement being true of the innermost electrode tube by reason of the provision of the inner neutral tube 20ᶜ.

The use of plain tubes for the electrodes and neutral plates enables the boiler to be constructed quickly, easily and inexpensively as the tubes are either standard material or may be very readily made. All the tubes should be perfectly smooth internally and externally to avoid projections which would cause local concentration of the current flow, and, therefore, unequal stress in the members, and tendency to local destruction. It will be seen that, by the method of construction hereinbefore disclosed submerged insulating separators, and, in fact, all manner of separators between the electrodes and the neutral plates are eliminated, with the result that the construction is simplified and the danger of short circuiting reduced to a minimum.

While the invention has been described and illustrated with reference to a three phase system, it will be understood that the invention is not thus limited, but applies, equally, to a system having any number of phases. In a single phase system two electrodes may be used, or the neutral element may serve as one electrode. In either case it will be necessary to insulate the neutral element from the boiler, unless the same is intended to be used as a conductor, included in the circuit.

The arrangement shown in Figures 3 and 4 is specially designed for low voltage system, in which a large electrode surface is necessary to produce the desired results. The arrangement illustrated provides for this large electrode surface in a comparatively small space. The separators between the electrode tubes and between the neutral tubes leave ample space for the circulation of water at the bottom, and the escape of steam at the top. While certain details of construction have, of necessity, been shown to disclose an operative device, it will be understood that the invention is not limited to the details of construction, proportions of parts, or numbers of tubes herein disclosed, as these may be varied within wide limits without departing from the spirit of the invention.

When the device is to be used as a water heater, it is kept completely filled with water which is passed through at any suitable rate.

Having thus described our invention what we claim is:—

1. In an electric steam generator, the combination with a tank for more than one phase, of tubular electrodes and tubular neutral plates, disposed concentric with the electrodes whereby uniform separation and current flow is made possible between each electrode and its corresponding neutral plate.

2. In a steam generator, the combination with a single tank for more than one phase, of tubular electrodes and tubular neutral plates, disposed concentric with the electrodes, said electrodes and plates being disposed eccentrically with the tank.

3. In a steam generator, the combination with a tank of a plurality of tubular neutral plates rigidly connected together to form a group, and means suspending the group as a unit in the tank, comprising suspension members connected one to each of certain members of the group.

4. In a steam generator, the combination with a tank, of a plurality of tubular neutral plates connected together and forming a group or unit, means suspending the group of plates as a unit in the tank, a tubular electrode disposed within each neutral plate concentric thereof, and means suspending said electrodes and holding the same in rigid spaced relation to each other and in concentric relation with the neutral plates.

5. In a steam generator, an electrode comprising a plurality of tubular members disposed concentrically, and a tubular neutral member disposed between each two adjacent electrode tubes, and concentrically thereof.

6. In combination with a device according to claim 5, a neutral tube encircling the outermost of said electrode tubes and an additional neutral tube disposed within the innermost electrode tube, all of said neutral tubes being rigidly connected together, and concentric with the electrode tubes, and disposed in spaced relation thereto, and electrically separated therefrom.

7. In a steam generator, a plurality of electrode tubes disposed concentrically in spaced relation, and a neutral tube encircling each of said electrode tubes, and disposed concentrically of the electrode tubes and in spaced relation thereto.

8. In combination with a device according to claim 7, means at the one end of said electrode tubes holding the same rigidly relatively to one another, and means at the opposite ends of the neutral tubes holding the same rigidly relatively to one another.

9. In combination with a device according to claim 7, spaced means connecting and holding the electrode tubes, and spaced means connecting and holding the neutral tubes, whereby free fluid passage is provided between said holding means.

10. In combination with a device according to claim 7, means interposed between the upper ends of the electrode tubes serving to mechanically space and hold the tubes and to electrically connect the same, and suspension means for the tubes connected to said separators and serving as electric conductors, and means interposed between the lower ends of the neutral tubes serving to mechanically and electrically connect the tubes and to position the same, and suspension means connected to the outermost neutral tube.

11. In a steam generator, an electrode comprising a series of concentrically arranged tubes and a neutral member comprising a series of concentrically arranged tubes, said electrode and neutral member being disposed with their tubes alternating with one another, and arranged concentrically of one another, said electrode tubes projecting upwardly beyond the neutral tubes, and the neutral tubes projecting downwardly beyond the electrode tubes, and means rigidly connecting the projecting ends of similar tubes.

12. In combination with a device according to claim 11, suspension means for the electrode tubes, and suspension means for the neutral tubes, one of said suspension means being disposed outside the other suspension means.

In witness whereof, we have hereunto set our hands.

ANDREW N. RUSSELL.
BERNARD A. MALKIN.
WILLIAM P. MUIR.